United States Patent Office 3,556,785
Patented Jan. 19, 1971

3,556,785
SENSITIZERS FOR ORGANIC PHOTOCONDUCTOR COMPRISING ORAZOLONE AND BUTENOLIDE DERIVATIVES OF FLUORENONE
Evans S. Baltazzi, Brookfield, Ill., assignor to Addressograph-Multigraph Corporation, Mount Prospect, Ill., a corporation of Delaware
No Drawing. Filed Feb. 23, 1968, Ser. No. 707,413
Int. Cl. G03j 5/00
U.S. Cl. 96—1.6     14 Claims

ABSTRACT OF THE DISCLOSURE

The compounds are of the class of oxazolone derivatives and butenolide derivatives of fluorenone useful as sensitizers for organic photoconductive media. An example of a particular species is 2-phenyl-4(2,4,7-trinitro-9-fluorenylidene)-5-oxazolone.

BACKGROUND OF THE INVENTION

This invention relates generally to organic photoconductive members, and in particular, relates to the addition of π-acid-type acceptors for the purpose of increasing the sensitivity range to electromagnetic radiation in the visible portion of the spectrum.

In the photoelectrostatic copying art, a recording member is prepared by applying a photoconductive polymeric layer to a conductive support. The organic photoconductive polymeric materials are known to contain aromatic or heterocyclic nuclei. Poly(N-vinylcarbazole) is a typical polymeric organic photoconductive material. In their unsensitized form, the organic photoconductive materials in general are known to have a rather slow response to electromagnetic radiation in the visible range, being more sensitive to radiation in the ultraviolet region of the spectrum.

The construction of photoelectrostatic reproducing equipment to process the organic photoconductive type members is greatly simplified if conventional filament-type sources of illumination could be used rather than the mercury vapor type lamps which are used as a source of ultraviolet radiation. The broadening of these spectro response range of these organic photoconductors to include the visible range of the spectrum may be accomplished by the addition of certain additives known as π-acids.

SUMMARY OF THE INVENTION

It is found that members from the class of compounds having the following general formula:

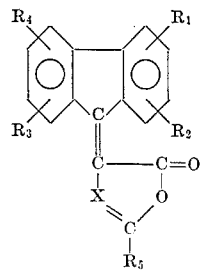

wherein $R_1$, $R_2$, $R_3$, and $R_4$ represent nitro-cyano, halogen, trifluoromethyl, lower alkyl, substituted lower alkyl, lower alkoxy, aryl, aralkyl and hydrogen substituents, X represents nitrogen or CH, $R_5$ is an aryl substituent, and wherein $R_1$, $R_2$, $R_3$, and $R_4$ can be the same or different give excellent results as sensitizers when added to organic photoconductive members of the donor type.

The preferred substituents in the aromatic nuclei are the nitro, bromo, and chloro substituents. The lower alkyl, and substituted lower alkyl, lower alkoxy can contain from 1–6 carbon atoms.

It is a general object of this invention to provide an improved organic photoconductive member which is sensitized to respond to the visible region of the spectrum through the use of a fluorenylidene derivative having a 5-membered heterocyclic ring attached to the 9 carbon atom in which the hetero atoms are nitrogen or oxygen.

DESCRIPTION OF THE PREFERRED EMBODIMENT

In carrying out the objects of the invention, the organic photoconductive material is dissolved in a suitable solvent. For the purposes of illustration reference will be made herein to the organic photoconductive material poly-N-vinylcarbazole. However, it should be understood that a wide range of organic photoconductive materials may be used and reference to poly-N-vinylcarbazole is merely for purposes of illustration and is not intended to limit the scope of the invention.

The poly-N-vinylcarbazole is dissolved in a suitable solvent such as chlorobenzene. The polymer is available under the trade name Luvican sold by Badische Anilin- & Soda-Fabrik A.G., Ludwigshafen, Germany. To the solution of the organic photoconductor there is added 0.2 moles to 1.2 moles of sensitizer to 100 moles of the organic photoconductive material in order to extend the photo response of the photoconductive material to the visible range of the spectrum. The preferred amount of sensitizer to be added is in the range of 0.6 moles to 1.0 mole of sensitizer to 100 moles of the organic photoconductive material. In the circumstance that the organic photoconductor is in polymerized form, the moles of polymer present are calculated on the basis of the molecular weight of the monomeric unit that comprises the polymer. For example, if the polymer is poly-N-vinylcarbazole the mole relationship of sensitizer to organic photoconductor is based on the molecular weight of the vinylcarbazole monomer.

The phenyloxazolone or butenolide derivative of substituted fluorenone is dissolved in methylene chloride and added to the polymeric organic photoconductive material, as for example poly-N-vinylcarbazole solution.

Preferred sensitizers are the nitro, halogen, and cyano substituted fluorenone compounds because they are electronegative or electron withdrawing, but other substituents in the fluorenone nucleus yield derivatives which are operable as sensitizers.

To the solution of polyvinylcarbazole and the sensitizer there may be added additional chlorobenzene in order to adjust the viscosity of the coating solution to the proper level. The viscosity level will depend on the type of coating equipment to be used.

Using conventional coating equipment, such as a meniscus coater or trailing blade coater, a thin film of the coating solution is uniformly applied to the conductive substrate. The solvent is then evaporated by forced air drying. The coating solution is applied at a rate such that the dry sheet has a photoconductive layer in the range of 0.15 to 0.50 mil, the preferred thickness being in the range of 0.2 to 0.3 mil thickness.

The methods of preparation of the compounds of this invention are known. The oxazolone derivatives of fluorenones may be prepared by reacting fluorenone with a hippuric acid in the presence of a dehydrating reagent. The dehydrating reagent is the complex of sulphur trioxide with dimethylformamide in an excess of dimethylformamide. Alternatively, aromatic oxazolones can be prepared following the classical procedure by reacting fluorenone with hippuric acid, acetic anhydride and anhydrous sodium acetate. Both methods of preparing the oxazolone are reported in "Chemistry and Industry," 1962, page 929.

Similarly, the butenolides can be prepared by reacting fluorenone with β-benzoylpropionic acid in the presence of a dehydrating agent, such as for example sulphur trioxide-dimethylformamide complex.

Alternatively, the butenolide may be prepared following the classical procedure by condensing the fluorenone with β-benzoylpropionic acid involving heating the reactants with acetic anhydride and fused sodium acetate. These procedures are described in "Chemistry and Industry," 1962, pages 1653–1654.

The following is a partial list of the compounds that can be used in carrying out this invention that come within the aforedescribed general formula:

2-phenyl-4(9-fluorenylidene)-5-oxazolone
2-phenyl-4(2,4-dinitro-9-fluorenylidene)-5-oxazolone
2-phenyl-4(2,4,7-trinitro-9-fluorenylidene)-5-oxazolone
2-phenyl-4(2,5-dinitro-9-fluorenylidene)-5-oxazolone
2-phenyl-4(2,6-dinitro-9-fluorenylidene)-5-oxazolone
2-phenyl-4(2,7-dinitro-9-fluorenylidene)-5-oxazolone
2-phenyl-4(2,4,5,7-tetranitro-9-fluorenylidene)-5-oxazolone
2-phenyl-4(3,6-dinitro-9-fluorenylidene)-5-oxazolone
2-phenyl-4(2,4-dicyano-9-fluorenylidene)-5-oxazolone
2-phenyl-4(2,4,7-tricyano-9-fluorenylidene)-5-oxazolone
2-phenyl-4(2,4,5,7-tetracyano-9-fluorenylidene)-5-oxazolone
2-phenyl-4(2,4-di-trifluoromethyl-9-fluorenylidene)-5-oxazolone
2-phenyl-4(2,4-dichloro-9-fluorenylidene)-5-oxazolone
2-phenyl-4(2,4,7-trichloro-9-fluorenylidene)-5-oxazolone
2-phenyl-4(2,4,5,7-tetrachloro-9-fluorenylidene)-5-oxazolone
α-(9-fluorenylidene)-γ-phenyl-$\Delta^\beta$,γ-butenolide
α-(2,4-dinitro-9-fluorenylidene)-γ-phenyl-$\Delta^\beta$,γ-butenolide
α-(2,4,7-trinitro-9-fluorenylidene)-γ-phenyl-$\Delta^\beta$,γ-butenolide
α-(2,5-dinitro-9-fluorenylidene)-γ-phenyl-$\Delta^\beta$,γ-butenolide
α-(2,6-dinitro-9-fluorenylidene)-γ-phenyl-$\Delta^\beta$,γ-butenolide
α-(2,7-dinitro-9-fluorenylidene)-γ-phenyl-$\Delta^\beta$,γ-butenolide
α-(2,4,5,7-tetranitro-9-fluorenylidene)-γ-phenyl-$\Delta^\beta$,γ-butenolide
α-(3,6-dinitro-9-fluorenylidene)-γ-phenyl-$\Delta^\beta$,γ-butenolide
α-(2,4-dicyano-9-fluorenylidene)-γ-phenyl-$\Delta^\beta$,γ-butenolide
α-(2,4,7-tricyano-9-fluorenylidene)-γ-phenyl-$\Delta^\beta$,γ-butenolide
α-(2,4,5,7-tetracyano-9-fluorenylidene)-γ-phenyl-$\Delta^\beta$,γ-butenolide
α-(2,4-di-trifluoromethyl-9-fluorenylidene)-γ-phenyl-$\Delta^\beta$,γ-butenolide
α-(2,4-dichloro-9-fluorenylidene)-γ-phenyl-$\Delta^\beta$,γ-butenolide
α-(2,4,7-trichloro-9-fluorenylidene)-γ-phenyl-$\Delta^\beta$,γ-butenolide
α-(2,4,5,7-tetrachloro-9-fluorenylidene)-γ-phenyl-$\Delta^\beta$,γ-butenolide

EXAMPLE I

The following coating solution was prepared following the general procedure set out above.

| | G. |
|---|---|
| Polyvinylcarbazole | 5 |
| Chlorobenzene | 65 |
| 2-phenyl-4-(2,4,7-trinitro - 9 - fluorenylidene) - 5-oxazolone | [1] .095 |
| (molecular weight=458.35) | |
| Methylene chloride | 35 |

[1] 0.8 mole/100 moles V.K.

EXAMPLE II

| | G. |
|---|---|
| Polyvinylcarbazole | 5 |
| Chlorobenzene | 65 |
| 2-phenyl-4 - (2,4 - dinitro - 9 - fluorenylidene) - 5-5-oxazolone | [1] .021 |
| (molecular weight=414.36) | |
| Methylene chloride | 35 |

[1] 0.2 mole/100 moles V.K.

EXAMPLE III

| | G. |
|---|---|
| Polyvinylcarbazole | 5 |
| Chlorobenzene | 65 |
| 2-phenyl-4-(2,4,5,7-tetranitro-9 - fluorenylidene)-5-oxazolone | [1] 0.16 |
| (molecular weight =503.35) | |

[1] 1.2 mole/100 moles V.K.

EXAMPLE IV

| | G. |
|---|---|
| Polyvinylcarbazole | 5 |
| Chlorobenzene | 65 |
| 2-phenyl-4-(2,6-dinitro-9-fluorenylidene)-5 - oxazolone | [1] .021 |
| (molecular weight=414.36) | |
| 2-phenyl-4-(2,4,5,7-tetracyano-fluorenylidene) - 5-oxazolone | [2] .088 |
| (molecular weight=423.40) | |

[1] 0.2 mole/100 moles V.K.
[2] 0.8 mole/100 moles V.K.

EXAMPLE V

This example follows the formulation of Example I with the exception that 2-phenyl-4-(2,4,7-tricyano-9-fluorenylidene)-5-oxazolone (molecular weight=398.39) was substituted for the 2-phenyl-4-(2,4,7-trinitro-9-fluorenylidene)-5-oxazolone.

EXAMPLE VI

This example follows the formulation of Example I with the exception that 2-phenyl-4-(2,4,7-trimethyl-9-fluorenylidene)-5-oxazolone (molecular weight=365.43) was substituted for the 2-phenyl-4-(2,4,7-trinitro-9-fluorenylidene)-5-oxazolone.

EXAMPLE VII

This example is the same formulation as set forth in Example I with the exception that 2-phenyl-4-(2,4,7-trichloro-9-fluorenylidene)-5-oxazolone (molecular weight=426.70) was substituted for the 2-phenyl-4-(2,4,7-trinitro-9-fluorenylidene)-5-oxazolone.

EXAMPLE VIII

| | G. |
|---|---|
| Polyvinylcarbazole | 5 |
| Chlorobenzene | 65 |
| $\alpha$-(9-fluorenylidene)-$\gamma$-phenyl-$\Delta^{\beta}$,$\gamma$-butenolide (molecular weight=322) | [1] 0.066 |
| Methylene chloride | 35 |

[1] 0.8 mole/100 moles V.K.

EXAMPLE IX

| | G. |
|---|---|
| Polyvinylcarbazole | 5 |
| Chlorobenzene | 65 |
| $\alpha$-(2,4,7-trinitro-9-fluorenylidene-$\gamma$-phenyl-$\Delta^{\beta}$,$\gamma$-butenolide (molecular weight=457) | [1] 0.024 |
| Methylene chloride | 35 |

[1] 0.2 mole/100 moles V.K.

EXAMPLE X

| | G. |
|---|---|
| Polyvinylcarbazole | 5 |
| Chlorobenzene | 65 |
| $\alpha$-(2,4,5,7-tetranitro-9-fluorenylidene)-$\gamma$-phenyl-$\Delta^{\beta}$,$\gamma$-butenolide (molecular weight=503.5) | [1] 1.57 |
| Methylene chloride | 35 |

[1] 1.2 mole/100 moles V.K.

EXAMPLE XI

| | G. |
|---|---|
| Polyvinylcarbazole | 5 |
| Chlorobenzene | 65 |
| $\alpha$-(2,4,7-tricyano-9-fluorenylidene)-$\gamma$-phenyl-$\Delta^{\beta}$,$\gamma$-butenolide (molecular weight=397) | [1] 0.82 |
| Methylene chloride | 35 |

[1] .8 mole/100 moles V.K.

EXAMPLE XII

| | G. |
|---|---|
| Polyvinylcarbazole | 5 |
| Chlorobenzene | 65 |
| $\alpha$-(2,4,7-trimethyl-9-fluorenylidene)-$\gamma$-phenyl-$\Delta^{\beta}$,$\gamma$-butenolide (molecular weight=364) | [1] 0.75 |
| Methylene chloride | 35 |

[1] .8 mole/100 moles V.K.

In each of the foregoing examples the photo response in the visible range was substantially increased over unsensitized polyvinylcarbazole.

The photoelectrostatic member of Example I or Example VIII upon being charged to a saturation voltage of 800 volts and then exposed to electromagnetic radiation in the visible range, such as emitted by a Sylvania filament lamp in a quartz envelope rated at an intensity of 36 f.c., discharged to a level of 300 volts in five seconds. In the circumstance that the photoelectrostatic member of Example I or Example VIII was prepared omitting the phenyl oxazolone derivative or the butenolide derivative, the voltage drop in volts per f.c.s. from a saturation of 800 volts to the same level of 300 volts was about 0.1 volts per f.c.s.

The photoelectrostatic members prepared using the other sensitizers disclosed herein gave similar increased photo response when added to the polyvinylcarbazole material.

The instant invention was described with great particularity reference being had to a specific organic photoconductive material, namely, polyvinylcarbazole. It will be readily apparent to those skilled in this art to substitute a large range of organic photoconductive materials for this specific organic photoconductor using either a monomeric form contained in an inert resin binder or a polymer capable of forming a continuous film when applied to a substrate.

Letters Patent of the United States is:

1. A photoelectrostatic recording element comprising a conductive base coated with an organic photoconductor of the electron donor type and a sensitizer having the formula:

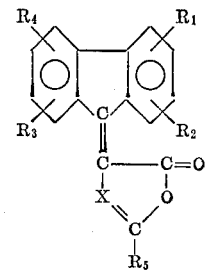

where $R_1$, $R_2$, $R_3$, and $R_4$ represent nitro, cyano, halogen, trifluoromethyl, lower alkyl, substituted lower alkyl, lower alkoxy, aryl, aralkyl and hydrogen substituents; X represents nitrogen or CH and $R_5$ is an aryl substituent and $R_1$, $R_2$, $R_3$, and $R_4$ can be the same or different.

2. A photoelectrostatic member as claimed in claim 1 in which the amount of sensitizer present is in the range of 0.2 to 1.2 moles sensitizer per 100 moles of organic photoconductor, based on the molecular weight of the monomeric unit of said organic photoconductive material.

3. The photoelectrostatic member as claimed in claim 1 in which the sensitizer is 2-phenyl-4-(2,4,7-trinitro-9-fluorenylidene-5-oxazolone.

4. The photoelecstatic member as claimed in claim 1 in which the sensitizer is 2-phenyl-4-(2,4-dinitro-9-fluorenylidene)-5-oxazolone.

5. The photoelectrostatic member as claimed in claim 1 in which the sensitizer is 2-phenyl-4-(2,4,5,7-tetranitro-9-fluorenylidene)-5-oxazolone.

6. The photoelectrostatic member as claimed in claim 1 in which the sensitizer is 2-phenyl-4-(2,4,7-trichloro-9-fluorenylidene)-5-oxazolone.

7. The photoelectrostatic member as claimed in claim 1 in which the sensitizer is 2-phenyl-4-(9-fluorenylidene)-5-oxazolone.

8. The photoelectrostatic member as claimed in claim 1 in which the sensitizer is $\alpha$-(9-fluorenylidene)-$\gamma$-phenyl-$\Delta^{\beta}$,$\gamma$-butenolide.

9. The photoelectrostatic member as claimed in claim 1 in which the sensitizer is $\alpha$-(2,4,7-trinitro-9-fluorenylidene)-$\gamma$-phenyl-$\Delta^{\beta}$,$\gamma$-butenolide.

10. The photoelectrostatic member as claimed in claim 1 in which the sensitizer is $\alpha$-(2,4-dinitro-9-fluorenylidene)-$\gamma$-phenyl-$\Delta^{\beta}$,$\gamma$-butenolide.

11. The photoelectrostatic member as claimed in claim 1 in which the sensitizer is $\alpha$-(2,4,5,7-tetranitro-9-fluorenylidene)-$\gamma$-phenyl-$\Delta^{\beta}$,$\gamma$-butenolide.

12. The photoelectrostatic member as claimed in claim 1 in which the sensitizer is $\alpha$-(2,4,7-trichloro-9-fluorenylidene)-$\gamma$-phenyl-$\Delta^{\beta}$,$\gamma$-butenolide.

13. The photoelectrostatic member as claimed in claim 1 in which the sensitizer is $\alpha$-(2,4,7-trifluoromethyl-9-fluorenylidene)-$\gamma$-phenyl-$\Delta^{\beta}$,$\gamma$-butenolide.

14. The method of making a reproduction comprising the steps of applying a sensitizing charge to an organic photoconductive medium of the electron donor type sensitized with a compound having the formula:

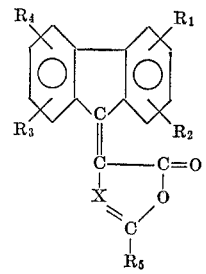

where $R_1$, $R_2$, $R_3$, and $R_4$ represent nitro, cyano, halogen, trifluoromethyl, lower alkyl, substituted lower alkyl, lower alkoxy, aryl, aralkyl, and hydrogen substituents; X represents nitrogen or CH and $R_5$ is an aryl substituent, wherein $R_1$, $R_2$, $R_3$, and $R_4$ can be the same or different; exposing said charged member to electromagnetic radiation in the visible range in a pattern of light and shadow to produce a latent image and applying electroscopic powder to produce a material image corresponding to said pattern of light and shadow.

References Cited

UNITED STATES PATENTS 3,287,121  11/1966  Hoegl _____ 96—1.5

GEORGE F. LESMES, Primary Examiner

M. B. WITTENBERG, Assistant Examiner

U.S. Cl. X.R.

96—1.5; 260—340.2, 343.6